Figure 4:
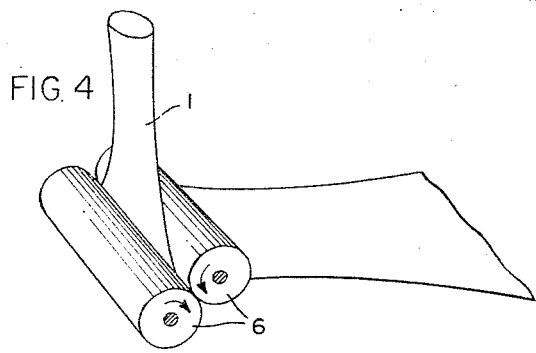

Feb. 28, 1967   K. WISSEROTH ET AL   3,306,963
PRODUCTION OF SHRINKABLE SHEETS AND FILMS
Filed June 8, 1964   2 Sheets-Sheet 1
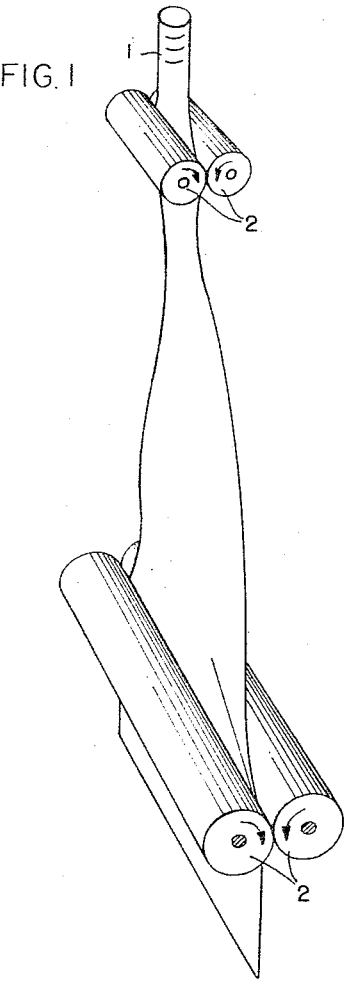
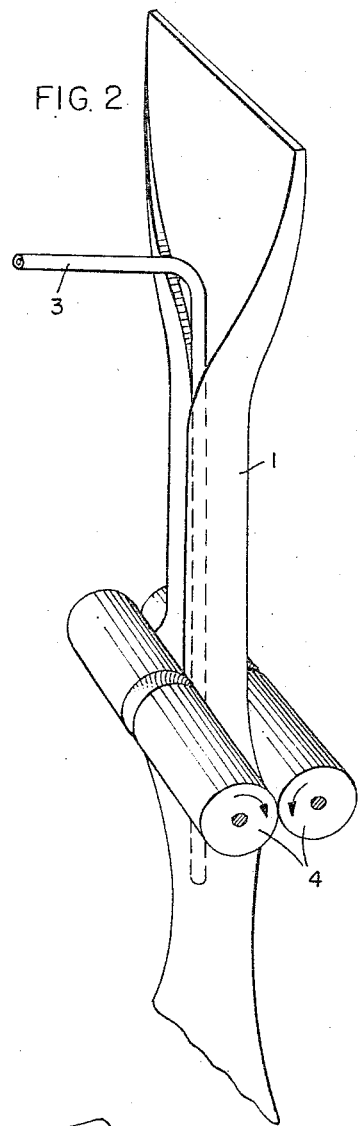
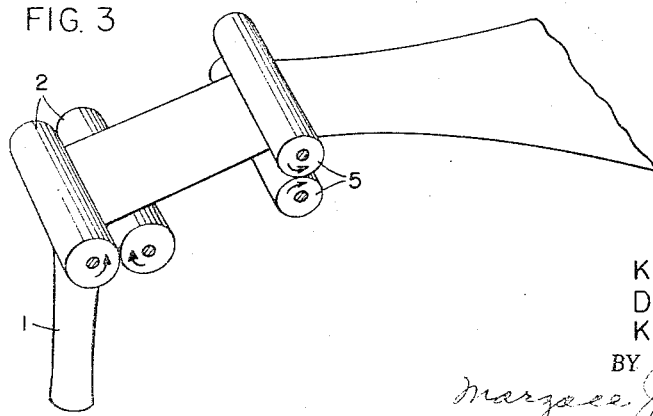
INVENTORS:
KARL WISSEROTH
DIETER VOLMER
KARL-HEINZ AMBIL
BY
ATT'YS Feb. 28, 1967 K. WISSEROTH ET AL 3,306,963
PRODUCTION OF SHRINKABLE SHEETS AND FILMS
Filed June 8, 1964 2 Sheets-Sheet 2

INVENTORS:
KARL WISSEROTH
DIETER VOLMER
KARL-HEINZ AMBIL
BY

ATT'YS

United States Patent Office 3,306,963
Patented Feb. 28, 1967

3,306,963
PRODUCTION OF SHRINKABLE SHEETS
AND FILMS
Karl Wisseroth, Ludwigshafen (Rhine), Dieter Volmer, Frankenthal, Pfalz, and Karl-Heinz Ambil, Ludwigshafen (Rhine), Germany, assignors to Badische Anilin- & Soda-Fabrik Aktiengesellschaft, Ludwigshafen (Rhine), Germany
Filed June 8, 1964, Ser. No. 373,208
Claims priority, application Germany, June 12, 1963, B 72,260
2 Claims. (Cl. 264—95)

It is known that certain plastics, for example polyethylene or ethylene copolymers are susceptible to the chemical crosslinking of the individual chain molecules with one another when they are irradiated, for example using radioactive substances, electron radiation and X-ray radiation, and also when they are treated with free organic radicals. It is also known that relatively thick sheets, for example having a thickness of 500 microns, can be crosslinked by irradiation and then stretched into thin films, for example having a thickness of 20 microns, at elevated temperature and fixed in this shape by cooling. When such films are heated to temperatures in the neighborhood of the melting point of the polymers, they shrink, the area being considerably decreased, for example to 10% of the original area, while the thickness is increased. In addition to their excellent shrinkage properties, these films of crosslinked plastics, particularly of crosslinked polyethylene, have very good resistance to high temperatures and extremely high transparency, even in the shrunk condition, in contrast to shrinkable films of plastics which have not been crosslinked.

We have now found that shrinkable sheets and films of plastics which are crosslinkable by free radicals can be prepared by extruding a homogeneous mixture of a thermoplastic and a free-radical forming compound in the form of a ribbon, preferably having a thickness of 1 to 2 millimeters, under conditions under which no formation of free radicals takes place, heating the ribbon on a support to temperatures of 160° to 280° C. so that the thermoplastic is crosslinked, pressing together the edges of the ribbon of crosslinked plastic at temperatures of 180° to 280° C. in the presence of gases containing oxygen with the formation of a tube provided wtih a longitudinal weld, converting this tube by inflation and simultaneous stretching in longitudinal direction at temperatures of from about 50° to 150° C. into a tubular film having a thickness of from 10 to 1000 microns and then cooling this tubular film under tension.

Substances which do not decompose appreciably with the formation of free radicals at temperatures below about 150° C. are suitable as free-radical forming substances. Organic peroxides are particularly suitable radical-forming substances, for example dicumyl peroxide, cumyl-tertiary-butyl peroxide, 2,5-di-(tertiary-butylperoxy)-2,5-dimethylhexane and many other tertiary peroxides. If the mixture is homogenised by kneading, the kneading should be carried out at such temperatures and only for such a period that no appreciable radical formation and consequently no premature and appreciable crosslinking can take place.

It has been found that satisfactory distribution of the crosslinking agent is achieved in many cases by spraying it in dilute acetone solution at room temperature on the plastics granulate and keeping the latter in constant motion, for example by agitation. After the extruded ribbon has issued from the die it may be cooled somewhat, for example by blowing air onto it. It is then supplied to a support which takes it away in the direction of extrusion.

The support may advantageously be an endless conveyor in the form of wire netting having a mesh width of from about 0.1 to 1.0 millimeter which moves the extruded plastics ribbon in the direction of extrusion at a rate which is at least as rapid as the rate of extrusion. If the speed of the wire netting is greater than the rate of extrusion of the ribbon, the ribbon is stretched somewhat in longitudinal direction, so that the thickness of the ribbon may be varied slightly and at the same time a certain longitudinal orientation of the individual macromolecules which are still mutually displaceable is achieved. Heating of the plastics ribbon on the support may be effected for example by heat radiation. During the crosslinking it is preferable to heat the ribbon to 200° to 240° C. so that a more or less extensively crosslinked ribbon is formed depending on the residence period. The residence period may in general be between about ten seconds and about twenty minutes. The degree of crosslinking of the plastic may if desired be determined by means of the gel test. In this the crosslinked plastic is extracted to constant weight with a solvent. The completely crosslinked portion of the plastic remains as an insoluble gel after the test. The crosslinking of the plastic in the process of this invention should in general be carried on up to a gel content of more than 50% by weight. During crosslinking, particularly by heat radiation, the ribbon in some cases adheres to the wire netting support. It can usually easily be detached from the support again by quenching with cold water.

The support for the plastics ribbon during crosslinking may also advantageously be a liquid heated to the crosslinking temperature and which has a higher specific gravity than the plastic. Glycerin is an example of a suitable liquid. In this case the extruded ribbon is first immersed in the liquid by means of deflecting means so that it becomes heated to crosslinking temperature and then it is allowed to float on the surface by its buoyancy in the liquid. By recycling of the liquid, the ribbon is moved forward at a speed adapted to the rate of extrusion. After leaving the crosslinking bath, the ribbon may if desired be cooled, for example by spraying on water. When the crosslinking is carried out on a wire netting, the plastics ribbon shows more or less clearly the pattern of the wire netting used. When crosslinking is done in a liquid on the other hand the surface of the ribbon is entirely smooth.

After the crosslinked ribbon has been removed from the support, the edges of the ribbon are pressed together at temperatures of 180° to 280° C., preferably 200° to 250° C., in the presence of gases containing oxygen. The edges are in general pressed together in an overlapping zone about 0.1 to 1.0 cm. in width for example with two streams of hot air one of which strikes the upper surface of the overlapping edges of the ribbon perpendicularly downward and the other strikes the lower surface of the overlapping edges of the ribbon perpendicularly upward. In this method, air is generally used as the gas containing oxygen. In particular cases it may be advantageous to use air to which oxygen has been added as the oxygen-containing gas. In some cases it is also possible to use air which has been diluted with nitrogen.

In this stage of the process, the two longitudinal edges of the ribbon are joined as a longitudinal weld to form a tube. Heating of the plastics tube for blow molding may be effected in a liquid or advantageously in a hot gas, for example air. During inflation, the tube (as shown in FIGURE 1 of the accompanying drawings) is nipped by two pairs of nip rollers 2 spaced apart by a distance of, for example, 1 to 1.5 meters or more. The first pair of rollers is advantageously located near to the welding means so that the amount of air required for inflation may be supplied through a capillary tube to the section of tubing between the two nip rollers. The capillary tube 3 (as shown in FIGURE 2) is passed within the tube 1 and together with this through the first pair of nip rollers 4 in which grooves are provided for the reception of the capillary tube. In order to be able to carry out inflation of the tube in the vertical direction there may be used an additional pair of deflecting rollers 5 (as shown in FIGURE 3) or (as shown in FIGURE 4) the pair of rollers 6 nearest to the welding means is positioned with its roller axis plane inclined by about 45° to the vertical axis of the tube. In order to obtain a film which will shrink biaxially almost uniformly, it is necessary that the peripheral elongation of the tube under the action of the prevailing gas pressure in the tube is equal to the longitudinal elongation of the tubular film which is achieved during inflation by a tensile force in the longitudinal direction of the tube.

The tube may be advantageously heated during inflation with hot gases, particularly hot air, the temperature being kept between about 50° and 150° C., preferably between 70° and 120° C. Heating may also be effected for example by irradiation with electric bulbs or an electrical heating furnace.

Figure 5:
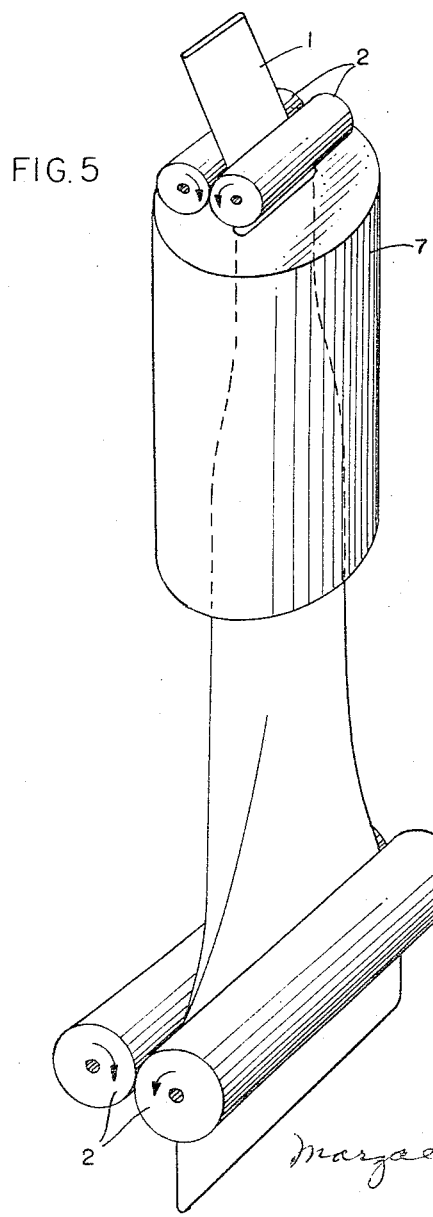

It has proved to be suitable in the process to move the tubular sheet 1 vetrically downward during inflation (as may be seen in FIGURE 5), for example by using nip rollers 2, and to provide a heating bath 7 in the upper part of the section of tubing between the nip rollers. In this way, the inflated tubular film may be cooled under tension particularly rapidly and simply, for example by spraying with water.

The tubular film may be wound up without difficulty in the cooled condition. The area shrinkage of the film during the process may be adjusted within limits by the stretching temperature and the stretch ratio. For example with polyethylene, films may be prepared which at the same shrinkage temperature shrink from 40 to 80% of the original area. Shrinkage of the films may be effected in the usual way by heating. With a given film, shrinkage is largely dependent on the shrinkage temperature. Thus for example a given film may show an area shrinkage of 8% at 70° C., 32% at 95° C. and 60% at 100° C.

Suitable thermoplastics for the process are particularly polyethylenes prepared by the conventional high pressure and low pressure polymerisation methods and which preferably exhibit a relatively high melt index, for example of 3 to 12. Copolymers of ethylene with, for example, propylene, butene-1 or vinyl esters, such as vinyl acetate or acrylic or methacrylic esters such as butyl acrylate, may also be used as initial material.

We claim:

1. A process for the production of shrinkable films from plastics which are crosslinkable by free radicals which comprises extruding a homogeneous mixture of an ethylene polymer and an organic peroxide in the form of a ribbon under conditions under which the peroxide does not decompose into free radicals, heating the ribbon on a support to a temperature of from 160° to 280° C. so that the ethylene polymer is crosslinked, said support being a wire netting formed as an endless belt and having a mesh width of from 0.1 to 1.0 millimeter which moves the extruded ribbon in the direction of extrusion at a speed which is at least as high as the speed of extrusion, pressing together the edges of the ribbon or crosslinked ethylene polymer at a temperature of from 180° to 280° C. in the presence of a gas containing oxygen with the formation of a tube having a longitudinal weld, converting this tube by inflation and simultaneous stretching in the longitudinal direction at temepratures of from about 50° to 150° C. into a tubular film having a thickness of from 10 to 1,000 microns and cooling the tubular film under tension.

2. A process for the production of shrinkage films from plastics which are crosslinkable by free radicals which comprises extruding a homogeneous mixture of an ethylene polymer and an organic peroxide in the form of a ribbon under conditions under which the peroxide does not decompose into free radicals, heating the ribbon on a support to a temperature of from 160° to 280° C. so that the ethylene polymer is crosslinked, said support being a liquid having a temperature between 160° and 280° C. which liquid has a higher specific gravity than the ethylene polymer and is moved in the direction of extrusion of the ribbon, pressing together the edges of the ribbon or crosslinked ethylene polymer at a temperature of from 180° to 280° C. in the presence of a gas containing oxygen with the formation of a tube having a longitudinal weld, converting this tube by inflation and simultaneous stretching in the longitudinal direction at temperatures of from about 50° to 150° C. into a tubular film having a thickness of from 10 to 1,000 microns and cooling the tubular film under tension.

References Cited by the Examiner

UNITED STATES PATENTS

| | | | |
|---|---|---|---|
| 2,307,817 | 1/1943 | Austin | 264—281 X |
| 2,862,234 | 12/1958 | Gerber | 264—95 X |
| 2,971,222 | 2/1961 | Weissman | 264—177 |
| 3,201,503 | 8/1965 | Benning et al. | 264—95 |

ROBERT F. WHITE, *Primary Examiner.*

A. R. NOE, *Assistant Examiner.*